(12) United States Patent
Bienstman et al.

(10) Patent No.: US 11,650,479 B2
(45) Date of Patent: May 16, 2023

(54) MULTIMODE RESERVOIR

(71) Applicants: UNIVERSITEIT GENT, Ghent (BE); IMEC VZW, Leuven (BE)

(72) Inventors: Peter Bienstman, Ghent (BE); Andrew Katumba, Ghent (BE); Jelle Heyvaert, Ghent (BE); Joni Dambre, Destelbergen (BE)

(73) Assignee: IMEC VZW, Leuven (BE)

( * ) Notice: Subject to any disclaimer, the term of this patent is extended or adjusted under 35 U.S.C. 154(b) by 656 days.

(21) Appl. No.: 16/617,265

(22) PCT Filed: May 26, 2018

(86) PCT No.: PCT/EP2018/063856
§ 371 (c)(1),
(2) Date: Nov. 26, 2019

(87) PCT Pub. No.: WO2018/219838
PCT Pub. Date: Dec. 6, 2018

(65) Prior Publication Data
US 2020/0249543 A1 Aug. 6, 2020

(30) Foreign Application Priority Data
May 29, 2017 (EP) .................................... 17173169

(51) Int. Cl.
*G02F 3/02* (2006.01)
*G06N 3/067* (2006.01)
(Continued)

(52) U.S. Cl.
CPC ............. *G02F 3/028* (2013.01); *G02B 6/125* (2013.01); *G02B 6/1228* (2013.01);
(Continued)

(58) Field of Classification Search
CPC .................................. G02F 3/02; G02F 3/028
See application file for complete search history.

(56) References Cited

U.S. PATENT DOCUMENTS 9,477,136 B2 * 10/2016 Bienstman ........... G06N 3/0445
10,031,287 B1 * 7/2018 Heroux ................ H04B 10/801
(Continued)

FOREIGN PATENT DOCUMENTS

EP 2821942 A2 1/2015

OTHER PUBLICATIONS

Vandoorne et al., "Parallel Reservoir Computing Using Optical Amplifiers," IEEE Transactions on Neural Networks, vol. 22, No. 9, Sep. 2011, pp. 1469-1481.
(Continued)

*Primary Examiner* — Charlie Y Peng
(74) *Attorney, Agent, or Firm* — Workman Nydegger

(57) ABSTRACT

A passive photonics reservoir computing system comprises an optical waveguide based structure comprising a plurality of discrete nodes and a plurality of passive waveguide interconnections between the nodes for propagating the at least one photonic signal between the nodes, in which each discrete node is adapted for passively relaying the at least one photonic wave over the passive waveguide interconnections connected thereto, wherein the optical waveguide based structure comprises at least one multimode Y-junction configured for connecting three waveguides using a taper section wherein the taper section is not perfectly adiabatic. A training scheme uses a passive photonics computing system.

12 Claims, 8 Drawing Sheets

(51) Int. Cl.
G06N 20/00 (2019.01)
G06N 5/04 (2023.01)
G02B 6/125 (2006.01)
G02B 6/122 (2006.01)

(52) U.S. Cl.
CPC ............. *G06N 3/0675* (2013.01); *G06N 5/04* (2013.01); *G06N 20/00* (2019.01)

(56) References Cited

U.S. PATENT DOCUMENTS

| | | | |
|---|---|---|---|
| 10,268,232 B2 * | 4/2019 | Harris | G06E 3/006 |
| 2015/0354938 A1 * | 12/2015 | Mower | B82Y 20/00 |
| | | | 356/450 |
| 2016/0162798 A1 * | 6/2016 | Marandi | G06N 3/0675 |
| | | | 708/191 |

OTHER PUBLICATIONS

Love et al., "Single-, Few-, and Multimode Y-Junctions," Journal of Lightwave Technology, vol. 30, No. 3, Feb. 1, 2012, pp. 304-309.
Dai et al., "Passive Technologies for Future Large-Scale Photonic Integrated Circuits on Silicon: Polarization Handling, Light Non-Reciprocity and Loss Reduction," Light: Science & Applications, vol. 1, 2012, pp. 1-12.
Vandoorne et al., "Experimental Demonstration of Reservoir Computing on a Silicon Photonics Chip," Nature Communications, vol. 5, Issue 3541, Mar. 24, 2014, pp. 1-6.
Zhang et al., "Integrated Photonic Reservoir Computing Based on Hierarchical Time-Multiplexing Structure," Tsinghua National Laboratory for Information Science and Technology, vol. 22, No. 25, Dec. 15, 2014, 15 Pages.
Van Der Sande et al., "Parallel Processing Using an Optical Delay-Based Reservoir Computer," Proceedings of Optical Diagnostics of Living Cells II, SPIE, vol. 9894, 2016, 6 Pages.
Van Der Sande et al., "Advances in Photonic Reservoir Computing," De Gruyter: Nanophotonics, vol. 6, No. 3, 2017, pp. 561-576.
Katumba et al., "Low-Loss Photonic Reservoir Computing with Multimode Photonic Integrated Circuits," Nature Scientific Reports, vol. 8, Issue 2653, Feb. 8, 2018, pp. 1-10.
European Search Report from EP Application No. EP17173169, dated Nov. 15, 2017.
International Search Report & Written Opinion from PCT Application No. PCT/EP2018/063856, dated Aug. 10, 2018.
Xu et al., "Recent Developments in Micro-Structured Fiber Optic Sensors," Fibers, vol. 5, No. 1, Jan. 10, 2017, 10 pages.
Office Action from corresponding Chinese Application No. 201880035939.8, dated Feb. 23, 2023.

* cited by examiner

MULTIMODE RESERVOIR

FIELD OF THE INVENTION

The invention relates to the field of optical reservoir computing. More specifically it relates to methods and systems for optical reservoir computing with low loss.

BACKGROUND OF THE INVENTION

The field of machine learning aims to teach computer systems how to perform complex tasks on previously unseen data, without explicitly programming them. Examples of such tasks are classification, regression or pattern recognition. The arsenal of available machine learning techniques is comprehensive.

For every application the most appropriate technique has to be selected, depending on the application's specific demands. One important class of techniques are the so-called artificial neural networks, that consist of a network of interconnected neurons. This idea was based on the structure of the human brain and how it processes information. One subclass of the neural networks, called recurrent neural networks (RNN), introduces a notion of memory to the network, by creating directed interconnection cycles between neurons. Because training these networks is rather difficult, reservoir computing (RC) was proposed as a methodology to ease RNN training. More recently however it has gained popularity as a computational paradigm to solve a variety of complex problems. It has been shown that RC performs very well on e.g. speech recognition and time series prediction.

RC implementations are typically software-based and rely on sequential algorithms to simulate signal propagation and manipulation throughout the network. The sequential character of this workflow sets a limit to the speed and power efficiency: simulating large reservoirs or extensive input sequences is both time intensive and very power consuming. The idea of exploiting the intrinsic parallel nature of reservoirs has triggered an interest in feasible hardware implementation technologies. A wide variety of RC realisations in hardware have been proposed so far. An interesting candidate technology definitely is the field of photonics, which led to the concept of photonic reservoir computing (PRC). The most important advantages of light as an information carrier are the very high carrier frequency of optical signals, their inherent parallelism and the fact that optical signals can be carried over dielectric materials with low loss. The use of optical signals hence enables faster (and strong parallel) information processing and holds the promise of lower power consumption than electronic implementations. To save power, a passive PRC implementation was presented in K. Vandoorne et al. *Nat. Commun.*, 5 (2014) 3541, that made use of grating couplers, MMIs and delays. Unfortunately, these components introduce severe losses in the reservoir that set a limit to the size of the reservoir (i.e. the number of neurons). More particularly, due to the structure of the network involving Y-splitters/combiners, because of basic physics, every time two paths converge in a node, one loses on average 50% of the light, which is radiated away, and therefore lost, as shown in FIG. 2. The larger the network, the more of these combiners are encountered, which means that the information decays rapidly and is not able to reach the other end of the network. E.g., in the system as described by Vandoorne et al. in *Nat. Commun.* 5 (2014) 3541, even though the network contained 20 nodes, one was only able to measure 12 of them, since for the other nodes, the power had dropped beyond the noise floor.

Because the complexity of tasks the reservoir can perform depends on the number of neurons it consists of, these losses also limit the complexity of tasks that can be performed, and consequently there is still room for improvement.

SUMMARY OF THE INVENTION

It is an object of embodiments of the present invention to provide efficient passive photonic reservoir computing methods and systems which show low losses.

It is an advantage of embodiments of the present invention that the systems allow for upscaling to a large number of nodes, since the losses occurring in the system can be limited.

It is an advantage of embodiments of the present invention that higher efficiencies can be obtained. It is furthermore to be noted that a small increase of efficiency results in an overall large gain, since combining and splitting of waves occurs a plurality of times, i.e. a series of splitters and or combiners typically is used in passive optical computing reservoirs according to embodiments of the present invention.

It is an advantage of embodiments of the present invention that by using more broad waveguides, multiple guiding modes are supported.

It is an advantage of embodiments of the present invention that if the multiple modes are read out separately, more observables in the system are created, which can improve the performance of the reservoir through enhanced richness of the dynamics.

It is an advantage of embodiments according to the present invention that use can be made of training method that does not require exact knowledge of the system states, but is able to reconstruct them in an efficient way by using a particular training sample multiple times.

It is an advantage of embodiments of the present invention that a readout structure is provided that uses very little power, resulting in an efficient system.

It is an advantage of embodiments of the present invention that pn junctions only use very small power, i.e. the power corresponding to the leakage current.

It is an advantage of embodiments of the present invention that the number of photodiodes required can be small or even restricted to one, resulting in a system comprising a limited number of components It is an advantage of embodiments according to the present invention that use can be made of the well-known silicon photonics technology, resulting in well-known processing methods for manufacturing the system.

The present invention relates to a passive photonics reservoir computing system, the system comprising an optical multimode waveguide based structure comprising a plurality of discrete nodes and a plurality of passive multimode waveguide interconnections between the nodes for propagating at least one photonic signal between the nodes, in which each discrete node is adapted for passively relaying the at least one photonic wave over the passive multimode waveguide interconnections connected thereto, wherein the optical waveguide based structure comprises at least one multimode junction configured for connecting at least three multimode waveguides using a taper section wherein the taper section is not perfectly adiabatic.

In case three waveguides are connected, the multimode junction may be referred to as a multimode Y-junction. It is an advantage of embodiments of the present invention that because of the multimodality of the involved waveguides a portion of radiation that was converted in a higher order mode in the waveguide structure is still guided in the waveguide structure and therefore is not lost. It is an advantage of embodiments of the present invention that a more rich system is obtained, having more degrees of freedom, if e.g. each mode is read out individually. This may result in a better classification performance. It is an advantage of embodiments of the present invention that if a taper section offers a less smooth evolution towards the output waveguide, not all power will stay within the same mode but power can be scattered to supported (guided) modes. In this way the radiation, and corresponding power, is not scattered out of the structure.

It is an advantage of embodiments of the present invention that a compact solution is provided.

It is an advantage of embodiments of the present invention that systems are provided that show large topological freedom as well as good speed.

It is an advantage of embodiments of the present invention that it provides efficient systems that can be implemented on larger scale.

Where in embodiments of the present invention reference is made to a plurality of nodes, reference is made to at least two nodes, advantageously at least three nodes, more advantageously at least 5 nodes.

The nodes may be configured for performing the plurality of splitting and/or combining in the passive photonics reservoir computing system via multimode junctions configured for connecting at least three multimode waveguides using a non-perfect adiabatic taper section.

It is an advantage of embodiments of the present invention that higher efficiencies can be obtained. It is furthermore to be noted that a small increase of efficiency results in an overall large gain, since combining and splitting of waves occurs a plurality of times, i.e. a series of splitters and or combiners typically is used in passive optical computing reservoirs according to embodiments of the present invention.

The multimode junctions may be multimode Y-junctions for connecting three multimode waveguides.

The waveguides may have a width of e.g. at least 500 nm, advantageously at least 1000 nm. The width of the waveguides may be selected as function of the wavelength used, such that these support guiding multiple modes. It is an advantage of embodiments of the present invention that by using more broad waveguides, multiple guiding modes are supported.

The taper length may be between 2 μm and 2.5 μm. The taper length may be selected as function of the wavelength used, such that these support guiding multiple modes.

Other parameters that may tune the adiabaticity are for example taper width and angle between the outgoing waveguides in case of a splitter or incoming waveguides in case of a combiner.

The optical waveguide based structure may be configured for performing weighting of resulting radiation signals in the optical domain and wherein the system is configured for combining the weighted signals using multimode Y-junctions configured for connecting three waveguides using a taper section wherein the taper section is not perfectly adiabatic. It is an advantage of embodiments of the present invention that a readout structure is provided that uses very little power, resulting in an efficient system.

The system may comprise reverse-biased pn junctions for weighting the resulting radiation signals. It is an advantage of embodiments of the present invention that reversed-biased pn junctions only use very small power, i.e. the power corresponding to the leakage current.

The weighted signals may be combined in a larger-area photodiode configured for performing a non-linear operation on the weighted resulting radiation signals. It is an advantage of embodiments of the present invention that the number of photodiodes required can be small or even restricted to one, resulting in a system comprising a limited number of components.

Performing a non-linear operation may comprise taking the power of the weighted resulting radiation signals prior to summing the weighted resulting radiation signals.

The system may comprise a training module for determining a power of different channels in the system and a phase difference between different channels in the system.

A channel may be defined as a different route a photonic signal may follow in the system.

The training module may be configured for obtaining training data whereby weighting coefficients are selected by subsequently selecting one of the weighting coefficients equal to 1, while setting all other weighting coefficients to 0, and by selecting two of the weighting coefficients equal to 1, while setting all other weighting coefficients to 0.The last step may be repeated to lift a pi phase shift degeneracy. In another example, a larger weight may be provided for a smaller signal, in order to get a better resolution. In some examples, also a set of 2 non-zero weights may be used to lift the pi phase shift ambiguity.

It is to be noted that the training module and weighting system as well as the corresponding methods are not limited to photonic reservoir computing systems but can be more broadly applied to photonic computing systems such as photonic wave-based computing systems.

Alternatively, continuous phase tuning could also be used in the training module for extracting weighting coefficients.

The system may comprise a passive silicon photonics reservoir. It is an advantage of embodiments according to the present invention that use can be made of the well known silicon photonics technology, resulting in well known processing methods for manufacturing the system. Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
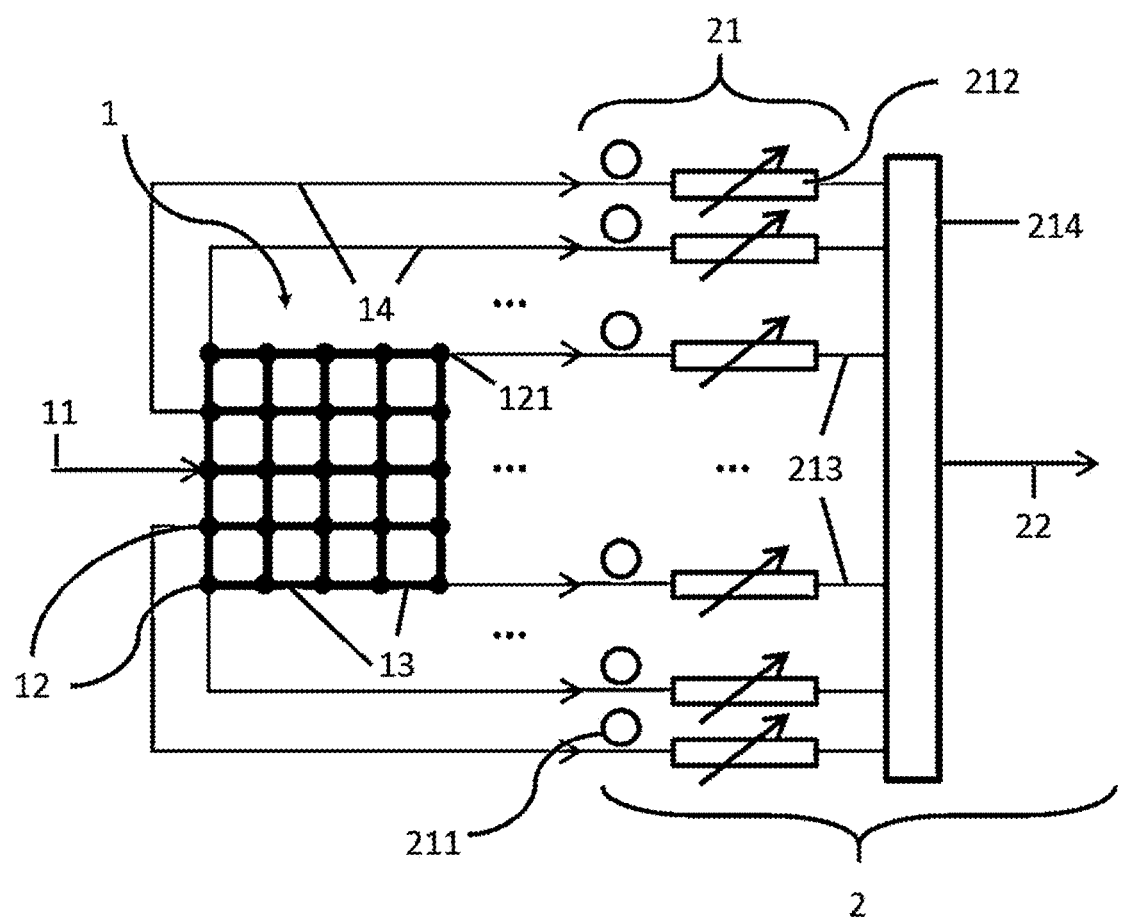
FIG. 1 illustrates the passive reservoir computing system and an attached module for training the outputs, as can be used in embodiments according to the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to Y-junction reference is made to a three-port device designed to split guided waves of a first port, the in-port, symmetrically or asymmetrically into guided waves of the two other ports, the out-ports, or to combine the guided waves of two ports, the in-ports, into a guided wave of the third port, the out-port. Furthermore a single-mode Y-junction is referred to as above Y-junction in which input and output ports are made of waveguides that only guide waves consisting of one single mode. In contrast thereto, a multimode Y-junction is referred to as above Y-junction in which at least one port contains a waveguide that supports guided waves comprising more than just one mode.

Where in embodiments of the present invention reference is made to non-perfectly adiabatic smooth tapers or tapering sections reference is made to smoothly tapered structures that change their shape over length scales not compatible with the adiabatic theorem. This means that the waveguide modes are significantly mixed, e.g. an important amount of energy confined to the ground state, the fundamental mode, is converted into the excitations of higher order modes, and the other way around. This process might include radiative losses and typically has lower conversion efficiencies than adiabatic tapering sections yielding single-mode conversion efficiencies close to 100%, e.g. greater than 98%. Non-perfectly tapers therefore may have a conversion efficiency smaller than 98%, e.g. smaller than 95%.

In a first aspect, the present invention relates to a passive photonics reservoir computing system, the system comprising an optical multimode waveguide based structure comprising a plurality of discrete nodes and a plurality of passive multimode waveguide interconnections between the nodes for propagating the at least one photonic signal between the nodes. A plurality of nodes may refer to at least 2 nodes, e.g. at least three nodes. Each discrete node is adapted for passively relaying the at least one photonic signal over the passive waveguide interconnections connected thereto. According to the present invention, the optical waveguide based structure comprises at least one multimode junction configured for connecting at least three waveguides using a taper section wherein the taper section is not perfectly adiabatic. The junction may be a Y-junction in case of connection between three waveguides. More generally, the junction may be referred to as a N×M coupler, whereby N and M are different from each other. Depending on whether the number of inputs or the number of outputs being larger, the coupler may be referred to as a combiner respectively splitter.

By way of illustration, embodiments of the present invention not being limited thereto, standard and optional features will further be described with reference to FIG. 1 which shows a schematic drawing of the passive reservoir computing system 1, and to FIG. 2 displaying the general shape of Y-junctions 31, 32, 33 as used to split and combine light signals at the location of the nodes 12 inside the passive reservoir 1. Whereas in the present description Y-junctions will be used to explain features and advantages of embodiments of the present invention, the present invention is not limited thereby a more general N×M couplers also may be used, as also indicated above.

FIG. 1 demonstrates how the information carried by the input signal is processed by the passive reservoir system 1, and its readout mechanism 21 used to derive an output signal 22 as being part of the training module 2.

The passive reservoir computing system 1 of the example shown in FIG. 1 is conceived as a collection of passive nodes 12 which are interconnected via multimode waveguides 13. The multimode waveguides 13 can be fabricated in any suitable way. In the current example, the multimode waveguides 13 are implemented on a silicon chip and typically may be wider than 500 nm, ideally they are wider than or equal to 1000 nm if they are operated at wavelength around 1300 nm. The width of the waveguides typically may be one of the factors determining the multimode behavior of the waveguide. It is to be noted that the multimode waveguides may be implemented in any suitable material platform such as for example as semiconductor waveguides such as Si, SiN, polymer waveguides like SU8, glass substrates, . . . .

The nodes 12 of the passive reservoir computing system may be arranged on a regular grid as shown in FIG. 1, although embodiments are not limited thereto and also an irregular grid may be used. The more nodes 12 the passive reservoir system 1 contains the better its capacity to remember past signals and therefore its computational and predictive power. Optical signals traversing the passive reservoir computing system 1 as bound, guided modes inside the multimode waveguides 13 encounter a plurality of nodes 12 which repeatedly recombine, split and hence redirect them into new directions. A disadvantage of the repeated action of combining in existing prior art systems is the inherent loss the signal experiences after crossing several nodes 12, dropping quickly to the noise floor level where all the information carried by the signal is lost. This loss is an intrinsic characteristic of single-mode 50/50 splitters 31 when operated with coherent light in a single mode 321 in reverse direction to function as signal combiners 32, in case the input powers are not perfectly in phase. An example of a single mode splitter and a single mode combiner is illustrated in the two upper drawings of FIG. 2. On average in prior art systems 50% of the signal power is lost in such a pass because part of the combined signal constitutes a higher mode 322 at the output which is unguided and therefore radiates away. Embodiments of the present invention improve the overall passive reservoir system performance by introducing multimode junctions 33 as splitters and/or combiners located at the nodes 12 of the passive reservoir system 1, so that reduced losses occur. The latter will be described further below, with reference to FIG. 2.

Figure 2:
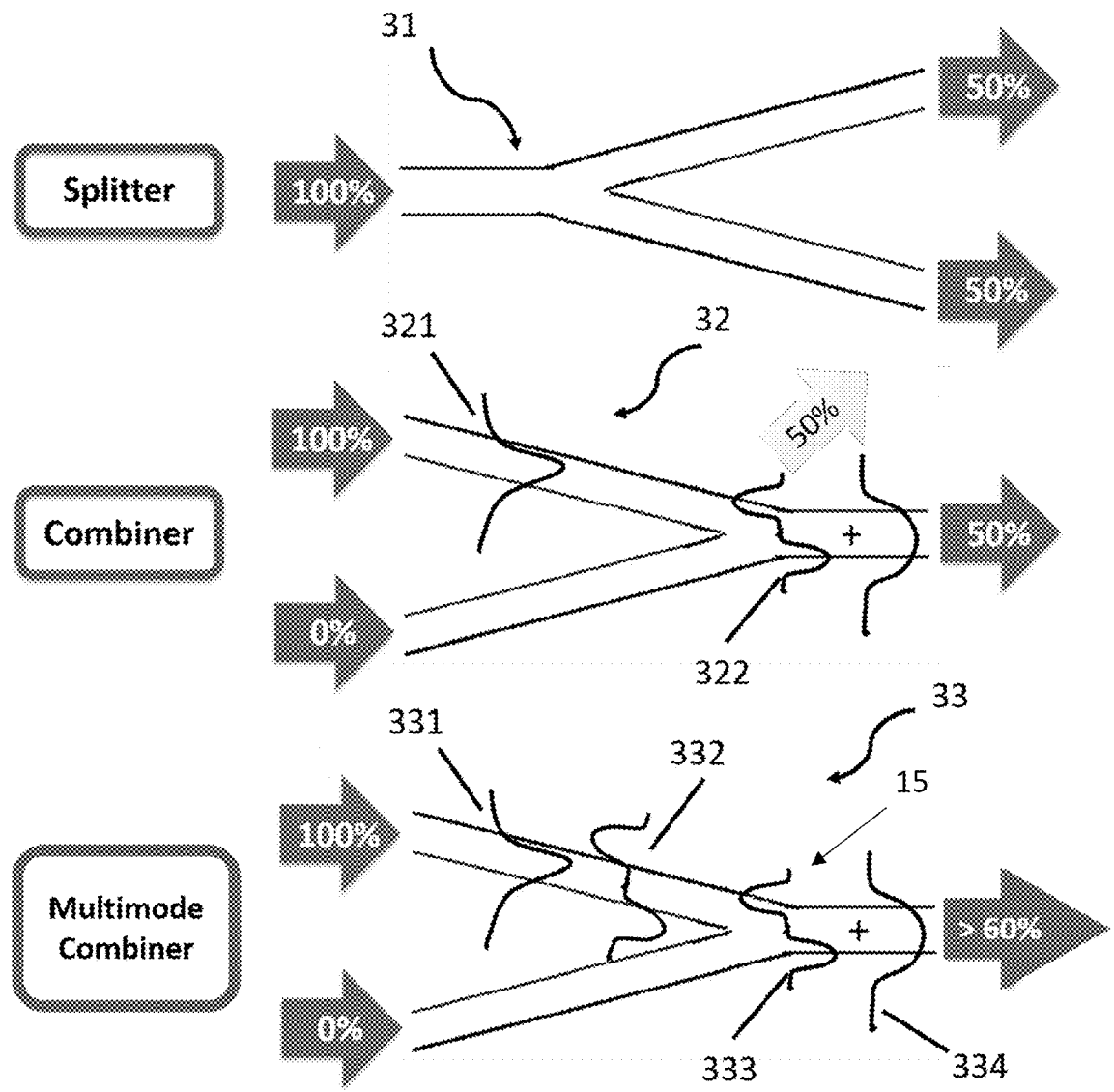
FIG. 2 is a schematic drawing of different Y-junctions used as splitters and combiners, illustrating features of the state of the art and of embodiments according to the present invention.

In FIG. 2, the lower drawing illustrates the example of a multimode combiner, whereby the combination of a multimode signal is shown. The junction 33 is not perfectly adiabatic and the input and output waveguides are also multimode. These support one or more higher order modes 332, 333 in addition to the fundamental waveguide modes 331, 334.

Referring again to FIG. 1, the passive reservoir computing system 1 receives one or more radiation input signals 11, also referred to as the at least one photonic signal 11, which are varying in time and conveying encoded information external to the device. The radiation input signals 11 may be modulated free-space coupled light waves or modulated fiber coupled optical modes. All the radiation input signals 11 are injected into one or more reservoir nodes 12, for example through out-of-plane grating coupler elements or a single out-of-plane grating coupler element followed by a sequence of Y-junctions 33 that split up the incoming radiation signal 11. The input signal is represented in a high-dimensional feature space given as the collection of fields present and extracted 14 at one or more reservoir nodes 12. As the state of the passive reservoir computing system 1 is evolving in time, the original input signal 11 is spread out over the entire passive reservoir system 1, undergoing multiple combination and splitting events. The use of multimode Y-junctions 33 in combination with multimode waveguides is advantageous in light of the increased amount of total optical signal power retained inside the passive reservoir 1 after each of those events. It is an advantage of embodiments of the present invention that even remote nodes 121 of the passive reservoir 1 can become measurable whereas they were not in previous reservoir systems due to too strong losses experienced by radiation signals travelling along these paths. The extracted optical signals 14 are routed into and modified by the training module 2.

A complex weighting scheme at the readout stage 21 may be implemented entirely in the optical domain, but is not restricted thereto as equivalent opto-electronic or fully electronic versions can be envisioned. This has the advantage of reducing complexity and costs that would be incurred to the readout mechanism 21 if it was fully electronic.

One or more of the extracted optical signals 14 are multiplied by a complex weight by, for instance, first attenuating or amplifying the signal amplitude. In one particular example, attenuating the signal amplitude is obtained through a reduced transmissivity of a detuned microring cavity 211, and by subsequently applying a phase shift in a linear phase shifter region 212. In both cases the effective index of the multimode waveguide can be changed according to the refractive index changes induced by field inside a reverse-biased pn-junction. Reverse biased Pn-junctions have the advantage of much lower static power consumption over heater based phase shift solutions. Whereas heaters continuously draw current, the reverse-biased pn-junction only suffers from a tiny leakage current. Advantageously, all the weighted readout signals 213 are combined into a single output signal 22. In analogy to the use of multimode Y-junctions 33 in the passive reservoir system 1, the combination step can happen through a cascade 214 of for instance multimode Y-junctions 33 or tapering sections so as to reduce losses due to radiation modes. If the weighting scheme at the readout stage 21 is fully electronic, the combination step 214 may be fully electronic too, e.g. an electronic fan-in, but other implementations might be preferred. In case the desired output of the problem needs to be represented in the electrical domain, the output signal 22 should be converted into the electrical domain. This can be achieved by a large-area photodiode which covers the final, wide multimode waveguide at the end of the combining stage 214. At the same time the photodiode will carry out a non-linear signal transformation mapping electromagnetic field strengths into power values. Non-linear behavior is required for certain applications of reservoir computing systems.

The traditional reservoir computing training approach assumes that all the extracted optical signals 14 from the passive reservoir system 1 are observable and known. The present invention avoids this additional requirement, leading to a simplified training module 2 with only one output signal 22 which needs to be observed. This is achieved by an indirect determination of the extracted reservoir states 14 which is possible if training sequences 11 are presented multiple times to the passive reservoir system 1. Every time the training sample 11 is repeated, the complex weights may be changed as described below, illustrating an advantageous example of applying weights, embodiments not being limited thereto. Updating may for example be updating after the same input signal is presented a couple of times, e.g. 3.

Turn all the amplitude controlling weights 211 off by bringing them as close to zero as possible. Then activate a single amplitude controlling weight 211, e.g. the first one, and bring it as close to one as possible. The output signal 22 is then directly related to corresponding readout radiation signal 14, the relation being the non-linear squared norm operation of the photodetector converting the electric field strength into its corresponding power value (if necessary, the non-ideal transfer characteristic of the detector can be taken into account through calibration). Then repeat this procedure with all but the second weighting element turned off, and so forth.

In a second step the relative phase differences between all the extracted, optical reservoir output signals 14 are determined by selecting two of them at a time and switching them on, whereas the remaining ones are left in their off or zero states. The power value as given by the photodetector output 22 is recorded. Together with the prior extraction of the amplitude values of the extracted reservoir signals 14, this second measurement step allows the extraction of the relative phase difference between the two active reservoir output signals in 14. Finally, to be able to resolve a pi phase shift, a third measurement with two different non-zero input signals in the same 2 two input channels is performed. This step of three measurements is repeated with a second pair, and so forth.

This procedure of determining the reservoir output states 14 has the advantage of being faster than many brute-force black box optimization techniques. Instead of hundreds or thousands of iteration steps, the aforementioned method only requires O(3n) repetitions with n the number of extracted reservoir states 14.

As mentioned above, this procedure is subject to a primary characterization step which quantifies the amount of non-linear response of the photodetector as well as the voltage-phase shift curve of the pn-junctions.

By way of illustration, an example of an optimization of a multimode Y-junction will further be discussed, showing standard and optional features and advantages of systems according to embodiments of the present invention, although embodiments are not limited thereto. The optimization of the multimode Y-junction in the present example is based on performance results, measured in percentage loss of the input optical power as a function of waveguide widths and taper lengths, for a standard design kit Y-junction (Ipkiss). This is achieved by numerical simulations using Lumerical MODE solutions software to simulate the Y-junction device response when used as a splitter or combiner. To this end the varFDTD method was selected, an auto non-uniform meshing strategy was chosen at level 5 accuracy and a conformal variant 1 mesh refinement was applied. In the example, the wavelength was set to 1300 nm and a silicon-oxide cladding of refractive index 1.4469 surrounding the 220 nm high silicon waveguide structure with material parameters according to Palik's model in the Lumerical material database was used, but the settings and materials are not limited to the current choices. The structures were simulated and small gains, i.e. reduced loss, was found for the multimode systems. Although the efficiency gain seemed modest, it benefits from the multiple node passes inside the passive reservoir system 1, hence is amplified exponentially. As a consequence, the invention enables larger passive reservoir systems with more nodes, a great freedom in design topologies, and better computational performance.

The multimode guiding effect was studied for a splitter as well as for a combiner, by varying the width of the waveguides and junctions used. By increasing the width of the waveguides and junctions used, more modes will be guided. At 600 nm width, the first two modes (i.e. fundamental and first order mode) are strongly guided. A third mode exist, but is guided less strong. A width of 800 nm the first three modes are well guided, but now a fourth mode (i.e. third order mode with effective index of 1.46 with a cladding index of 1.4469) is weakly guided. The situation for a 1000 nm wide waveguide has evolved further towards four well-guided modes and a fifth (i.e. the fourth order mode) that is barely guided with an effective index 1.4495. The last design, with a width of 1200 nm, guides this fourth order mode better and does not support the fifth order mode yet.

Losses thus were simulated for different structures having a different width (600 nm to 1200 nm) of the waveguides and the junction. The obtained results learned that for wider waveguides and junctions, the losses were substantially smaller than for smaller waveguides and junctions. The latter illustrates the positive effect of the use of multiple modes, since these wider designs support multiple modes. Based on these positive results, further optimisation was performed.

The effect of the taper design on the power losses were also studied. In the present example, the 1 µm width waveguide design was used to optimize the taper length. Simulations were performed for a combiner with taper lengths 0.1 µm, 2 µm and 2.5 µm.

The results are shown in the tables below for a combiner. SE thereby refers to single excitation, whereas DE refers to double excitation.

TABLE 1

Incoherent combination of relevant modes for a combiner (fundamental, first order, second order, third order TE mode)

| Taper length | Transmission SE | Loss SE | Transmission DE | Loss DE |
| --- | --- | --- | --- | --- |
| 0.1 µm | 53% | 47% | 58% | 42% |
| 1 µm | 56% | 44% | 60% | 40% |
| 2 µm | 61% | 39% | 63% | 37% |
| 2.5 µm | 55% | 45% | 61% | 39% |

TABLE 2

Coherent combination of relevant modes for a combiner (fundamental, first order, second order, third order TE mode)

| Taper length | Transmission SE | Loss SE | Transmission DE | Loss DE |
| --- | --- | --- | --- | --- |
| 0.1 µm | 49% | 51% | 68% | 32% |
| 1 µm | 57% | 43% | 63% | 37% |
| 2 µm | 82% | 18% | 89% | 11% |
| 2.5 µm | 77% | 23% | 81% | 19% |

The optimization has resulted in lower losses, as expected. This can be seen by comparing the original 0.1_m taper length to the other taper lengths. The reduction of loss saturates between 2.0 µm and 2.5 µm. After that, losses slightly increase again. This can be explained as follows. By making the taper longer, the modes in the taper section are offered more time to smoothly converge towards the output modes while not making the taper more adiabatic and thus destroying the beneficial effect of a less-adiabatic Y-junction in multimode regime. So, between taper lengths 2.0 and 2.5 µm an optimum is reached: the taper is long enough to maximally reduce the unwanted losses without losing too much adiabaticity. Beyond that point on one side, losses still are reduced caused by the taper design, but adiabaticity starts to improve too much, resulting in the beneficial effect getting reduced and thus in more radiation loss and light that scatters out. Beyond the balanced point on the other side, a taper with an adiabaticity that is so weak is obtained that it will not counter the losses, but even contribute to the loss. In other words Although further optimization can be performed, simulation results already show an average loss of only 39% (single excitation) and 37% (double excitation) for the combiner (all in case of incoherently combined mode sources), which is much better than what the MMIs (50% loss) in current passive reservoirs can offer. Note that these values and modes of operation are specific to the specific design studied here and could be different for other designs.

Figure 3:
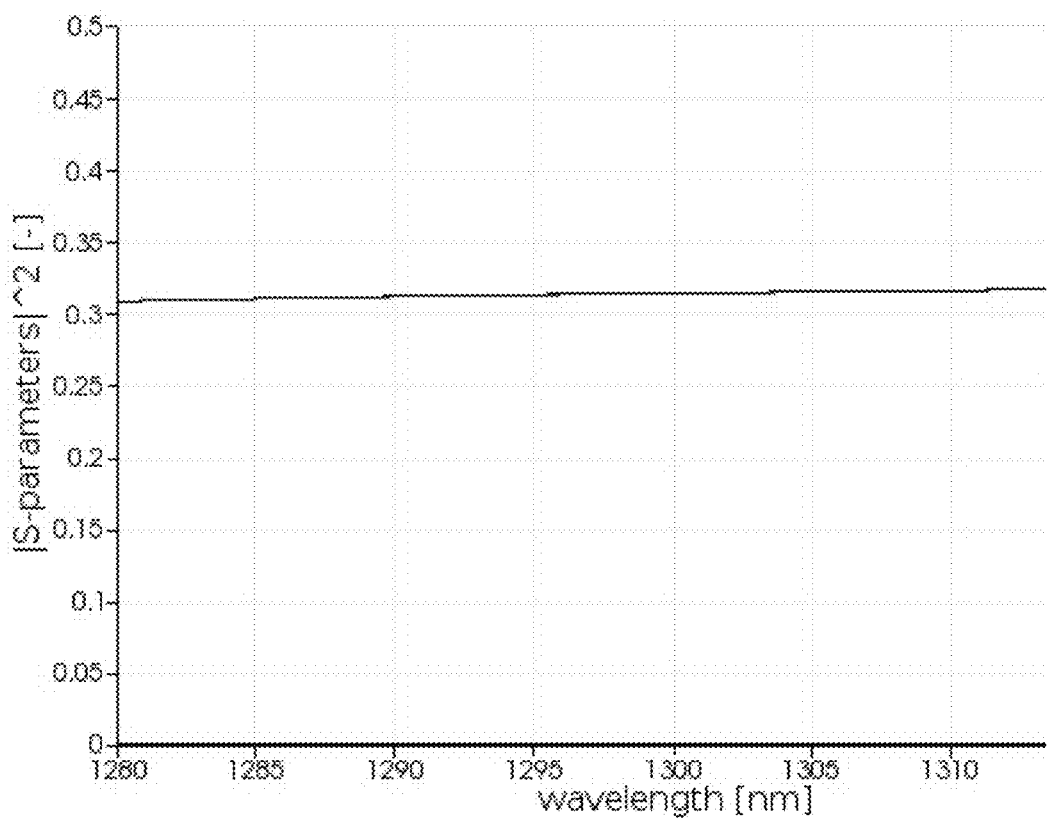
FIG. 3 illustrates the wavelength dependency of the efficiency of the passive reservoir computing system, according to an embodiment of the present invention.

Also the dependency of the wavelength used on the efficiency of the passive reservoir system was evaluated. The influence of the wavelength on the structure's behaviour was evaluated making use of the S-parameters, for a modelled simplified Y-junction. FIG. 3 illustrates the squared absolute value of the (complex) S-parameters of the Y junction as function of the wavelength whereby a 1 µm wide waveguide is used and the taper length was 2 µm. As an input, the fundamental mode was used. The wavelength is swept from 1280 up to 1320 nm, an interval around central frequency 1300 nm. These squared absolute values are a measure for the power flow corresponding to every S-parameter. It can be seen that the measured results correspond with substantially flat curves (almost horizontally oriented), illustrating that the wavelength does not have an important impact on the performance of the passive reservoir system. It is an advantage of embodiments of the present invention that variations in the wavelength used do not cause much variation on the performance of the system. This is in contrast to other approaches which use e.g. directional couplers, which are much more wavelength dependent.

Figure 4:
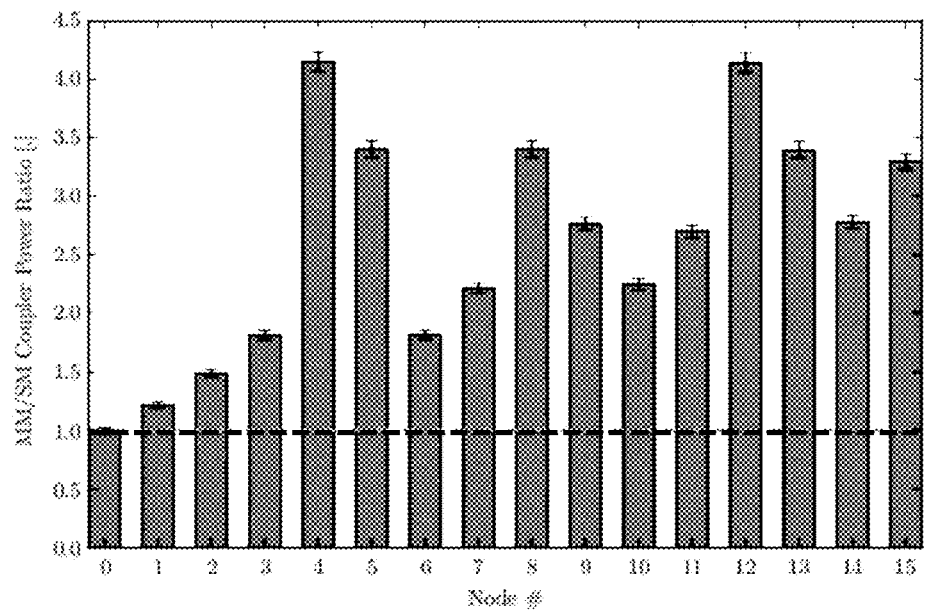
FIG. 4 illustrates the reduced loss for multimode compared to single mode for the different nodes, according to an embodiment of the present invention.

In another experiment, the overall loss between a single-mode junction and waveguide based reservoir and a multimode junction and waveguide based reservoir is compared. It thereby is to be noted that the performance on solving tasks is not substantially different but the losses occurring are substantially different. In FIG. 4, the power levels for a sixteen node passive reservoir are indicated whereby the single mode and the multimode reservoir are compared. The power ratio dividing the power of every node in the multimode reservoir by the power of the same node in the single mode reservoir is shown for a 1 bit delayed XOR task. Because the first node is used as input, its power did not change and its power ratio is equal to one. Except for node 1 and 2, all nodes clearly have a power ratio above the horizontal line that indicates where the ratio is equal to one. This which means that more power is measured in all those nodes for the multimode reservoir.

In a second aspect, the present invention relates to a passive photonics reservoir computing method. This method comprises the following steps described hereafter. Receiving one or more input signals at at least one node of the passive reservoir system. The input signal may be received by means of directly coupling in temporally varying optical waves or employing a transducing element to modulate photonic waves according to one or more input signals. Propagating delayed and reweighted versions of the one or more input signal inside the passive reservoir system, in which one or more multimode Y-junctions act as splitters or combiners at the passive reservoir node sites that relay the incoming and outgoing optical reservoir signals travelling along multimode waveguides in a power-efficient way. Further optional steps may be included, as can be seen from the exemplary method indicated below.

The method furthermore optionally may comprise probing one or more particular excitation states of the passive reservoir system at its node locations and routing them to a training module. It also may comprise applying a linear weighting scheme to the one or more probed reservoir output signals in the readout section of the training module. The weighting scheme is capable of changing the amplitude 211 and phase 212 of the respective one or more optical signals 14. Combining the one or more modified optical signals of the readout stage 213 into a single output signal 22, e.g. through a cascade 214 of multimode Y-junctions 33 or through a merging section 214 of tapered multimode waveguides, but not limited thereto. Mapping the output signal 22 in a non-linear fashion, e.g. through the action of a photodetector element converting complex-valued optical signals into real-valued electrical power levels. Training the readout weights 211, 212 in a supervised manner so as the match the output signal 22 with a desired teacher signal for a particular task. Reconstructing the one or more probed reservoir states 14 as a required input to the learning algorithm. This reconstruction is achieved by simultaneously observing the output signal 22 and presenting the one or more input signals 11 multiple times, activating a single weight 211 at a time and driving it to the on-state '1', leaving the remaining weights in the off-state '0', and by activating pairs of weights, driving them to the on-state '1', or more generally to a non-zero state, while leaving all the other weights in their off-state '0'. This last step happens twice, to lift the pi degeneracy.

Further by way of illustration, the present invention not being limited thereto, a further numerical study of a passive integrated photonics reservoir computing platform based on multimodal Y-junctions is discussed. The Y junctions are designed with a level of adiabaticity that is carefully tailored to capture the radiation loss in higher-order modes according to an embodiment of the present invention, while at the same time providing additional mode mixing that increases the richness of the reservoir dynamics. An overall average combination efficiency of 61% compared to the standard 50% for the single-mode case is obtained and it is demonstrated that much more power is able to reach the distant nodes of the reservoir, leading to increased scaling prospects. The example of a header recognition task is used to confirm that such a reservoir can be used for bit-level processing tasks. The design itself is CMOS compatible and can be fabricated through the known standard fabrication procedures.

Figure 5:
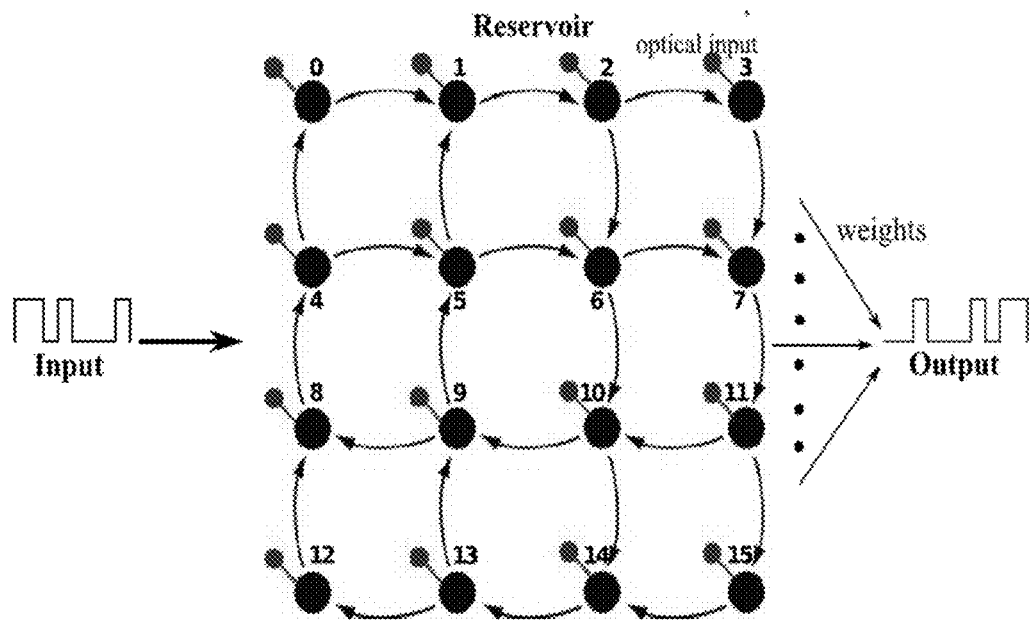
FIG. 5 illustrates a schematic of a photonic reservoir computing setup for handling tasks involving digital optical signals, as is used for illustrating features of embodiments according to the present invention.

The present example is based on a reservoir computing system as illustrated in FIG. 5. It shows a schematic of a photonic reservoir computing setup for handling tasks involving digital optical signals. The input is a non-return-to-zero on-off keying (NRZ-OOK) digital optical signal. The reservoir is composed of 16 nodes arranged in a swirl topology and the output is read from each node through a photodetector. From here on, nodes (the larger filled circles) will be referenced by their corresponding labels in the illustration. In the swirl architecture as is used here, the nodes are the locations at which states are appropriately combined and split and serve as input and detecting points (indicated by the smaller filled circles). To use the reservoir to solve a particular task, a machine learning algorithm is used to train a set of weights (the readout) using a set of known labeled example data, such that a linear combination of the optical signals recorded at each node approximates a desired output as closely as possible. These weights are then used to generate the output signal for any unseen subsequently injected input signal sequences. RC systems are fast to train and quickly converge to a global optimum. They have shown state-of-the-art performance on a range of complex tasks on time-dependent data (such as speech recognition, nonlinear channel equalisation, robot control, time series prediction, financial forecasting, handwriting recognition, etc.). A key discovery was that the reservoir computing platform provides a natural framework for implementing hardware-based learning systems for which there may be only a limited ability to granularly influence the internal state of the dynamical system (reservoir). Examples of RC implementations in mechanical systems, memristive systems, atomic switch networks, boolean logic elements and photonic systems are demonstrated. Moreover, integrated photonic reservoirs can push computation speeds even higher for digital information processing. Integrated photonic reservoirs are particularly compelling, especially when implemented in the CMOS platform as they can take advantage of its associated benefits for technology reuse and mass production.

Silicon photonics reservoirs are composed of nodes that are interconnected together in a planar topology such as that in FIG. 1. Since the interconnections between nodes are made up of spirals of a few centimeters, the material loss—≈2 dB/cm for single-mode 220 nm Si waveguides—is important. An equally significant source of signal loss is the loss at combiner points. Indeed, based on supermodetheory, combining single-mode waveguides in a Y-junction only has 100% transmission if the two inputs are exactly in phase. For anti-phase inputs, the transmission is 0%. Therefore, averaged over all possible phase differences, there is only a 50% transmission for each combiner traversed. An alternative way of expressing the same fact is by saying that if we only excite a single input of the combiner, we will have 50% transmission (Later on we will use this single-side excitation as a quicker way to model the average transmission for different phase differences). The 50% loss can quickly reach substantial values for large reservoirs with a lot of combiners. Using directional couplers instead of Y-junctions would in theory solve these issues, but they suffer from stringent fabrication tolerance requirements and narrow bandwidth. Both this combination loss and the propagation loss constrain the size of the reservoirs and hence limit the complexity of tasks they can tackle.

By using junctions according to embodiments of the present invention, the system allows for upscaling the number of nodes in the design as loss build-up can be limited. Even a relatively modest improvement in trans-nodal transmission yields a substantial overall gain, since splitting and combining of signals occurs a multitude of times before the signal is read out. This improvementhinges on using broader waveguides that hence support multiple modes.

One way to take advantage of multiple modes in reservoirs is by using them for loss reduction. A critical component in this design is the multimode Y-junction structure according to embodiments of the present invention that is used at the combiner/splitter points. The junction uses a taper section that is deliberately designed to be not perfectly adiabatic, ultimately resulting in energy efficiency benefits. Note that multimodal photonics is something which is typically not considered for other applications, because it leads to several complications (modal dispersion, more complex design, difficulty to selectively excite and maintain a select number of modes throughout the whole circuit, . . . ). However, in the context of the RC computing paradigm, none of these are of any consequence.

The key advantage from using the multimode Y-junction comes from the fact that a portion of the light that was previously scattered into radiation modes of the single-mode structure can now be captured into the higher-order guided modes. Indeed, in a case where e.g. light is only sent into one of the two input arms of a single-mode Y-combiner, when entering the output waveguide 50% of the light radiates away, as mentioned previously. However, if the output waveguide of the combiner supports multiple modes, this transmission increases to 100% for a perfectly adiabatic taper. Still, since part of this combined light is now carried by a higher-order mode as opposed to by the fundamental mode, it is still a fact that this higher-order light will radiate away at the next combiner. This is where the next part of the design comes into play: by deliberately designing the Y-junction to be non-adiabatic to a certain extent, we can hope to get a degree of conversion from these higher-order modes back to the lower-order modes which can propagate unhindered. Still, this beneficial process competes with the harmful reverse process of conversion from lower-order to higher-order modes. Therefore, it is not a-priori obvious that there will be design that offers a bigger than 50% transmission averaged over different modal compositions of input excitation.

First, the design of the multimode Y-junctions with low combiner loss according to an embodiment of the present invention will be discussed. First the cutoff conditions for different modes were determined. This was done numerically, as the well-established closed form 1D solution cannot easily be extended to practical 2D cases. Lumerical© Mode Solutions, a commercial mode solver package, was used to determine the modes of the waveguides. The fully vectorial FFM solver in Fimmwave©, which is based on the Film Mode Matching Method, was used to check the results for consistency.

Figure 6:
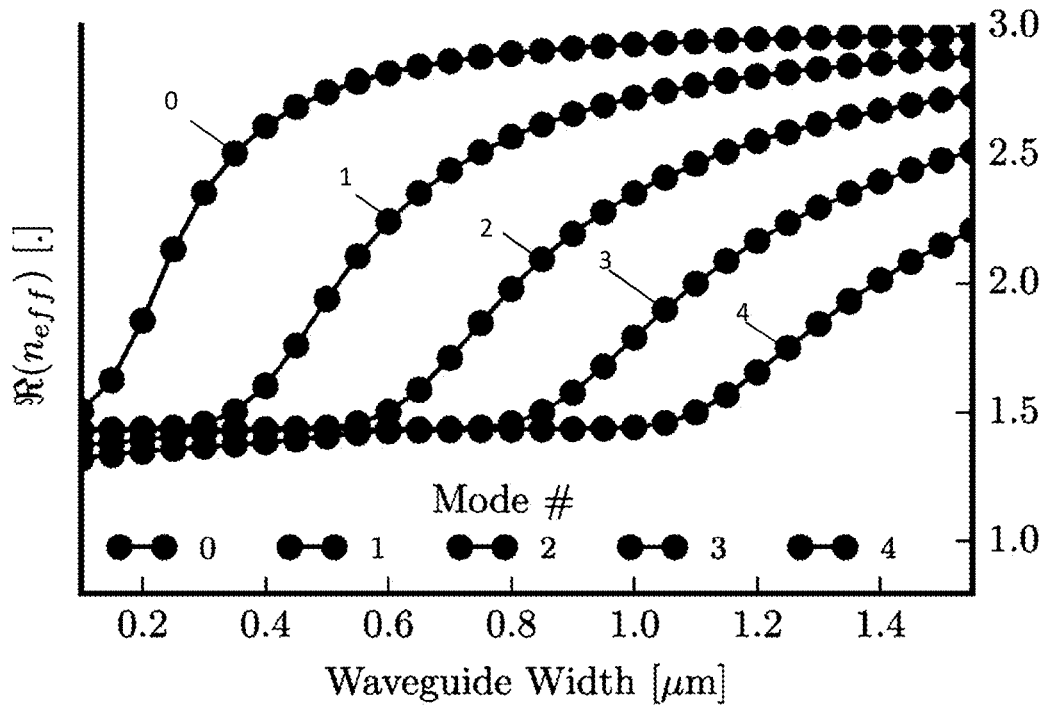
FIG. 6 shows a dispersion diagram for a 220 nm SOI waveguide for the TE polarization and a center wavelength of 1300 nm, whereby $n_{\mathit{eff}}$ is the complex effective indes of the mode, used in an exemplary embodiment of the present invention.

In the present example, an oxide-clad 220 nm silicon at 1300 nm on the SOI material platform was assumed. Focus is only made on the TE-like modes but a similar argument applies to TM-like modes (there is negligible interaction between the two mode groups). From the mode simulations the cut-off points for each mode were obtained and therefore one can choose what width to use in order for the waveguide to support a given number of modes (FIG. 6).

Figure 7:
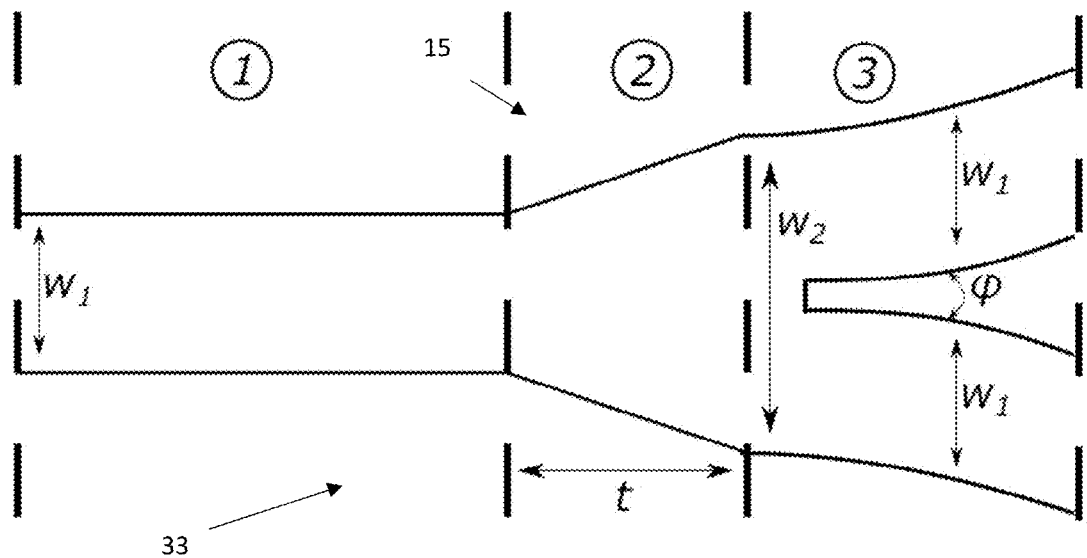
FIG. 7 shows a sketch of the Y junction indicating the sections critical to its performance for an exemplary embodiment of the present invention.

The Y-junction design for the simulations was composed of three sections as seen in FIG. 7, illustrating a sketch of the Y-junction indicating the sections critical to its performance. The input waveguide (section 1) of width w1 is followed by a linear taper of length t (section 2) leading into a wider waveguide with width w2. The third section starts off right after the taper and terminates into a split into the two output waveguides. The output waveguides (also referred to as arms) are all the same width w1 as the input waveguide of section 1. φ is the angle between the two output waveguides and is determined by the bend radius of the output waveguides. The smaller the bend radius, the larger the value of φ and vice versa.

Reference is made to the splitter configuration as the case when the input is on the left side of FIG. 7 in section 1.

For the combiner configuration, the junction is operated in the reverse sense. In contrast to the single objective criterion of maximizing adiabaticity for the single-mode Y-junction, designing a low loss multi-mode Y-junction combiner is a more intricate procedure, as the interactions and evolution of the modes through the junction drive the choice of the best geometrical parameters. Since sweeping all the geometric parameters would be very time-consuming, the simulations proceeded as follows. For all designs considered, w2=2 w1, and the bend radius for the two arms is set to 5 μm. Subsequently, the taper length t was fixed and the width of the input and output waveguides w1 was scanned in the range 600 nm-1200 nm. Then, the taper length t was optimized to achieve maximum transmission for the Y-junction with the selected width.

A first relevant parameter is the input and output waveguide width w1 for the Y-junction, for which four values are compared, inspired by different regimes in the dispersion diagram of FIG. 6. At 600 nm width, the first two modes (i.e. fundamental and first-order mode) are strongly guided. A third mode exists, but is guided less strongly. At a width of 800 nm, the first three modes are well-guided, but now a fourth mode (i.e. third-order mode with effective index of 1.46 with a cladding index of 1.4469) is weakly guided. The situation for a 1000 nm wide waveguide has evolved further towards four well-guided modes and a fifth (i.e. the fourth-order mode) that is barely guided with an effective index 1.4495. The last design, with a width of 1200 nm, guides this fourth-order mode better and does not support the fifth-order mode yet. The transmission was then simulated for these Y-junction designs through propagation simulations. For this purpose Lumerical© FDTD solutions, a commercial FDTD software package, was used.

If one considers the transmission results from the simulations for the combiner configuration with input to the upper arm only as presented in Table 3, the gains of moving to wider waveguides are evident. Compared to the single-mode fully adiabatic combiner, there is already a small improvement in the transmission from 50% to at least 53.18% occurring in the 1000 nm-1200 nm waveguide width region.

TABLE 3

Transmission for Y-junction combiners of different input and output waveguide widths w1 when the input is a particular modal excitation. The results here correspond to the case of excitation to the upper arm only. Missing values indicate that the particular mode is not guided for the waveguide width.

| Width$_{w1}$ (nm) | Combiner transmission (input to one arm only) | | | | | |
|---|---|---|---|---|---|---|
| | Funda-mental | $1^{st}$ order | $2^{nd}$ order | $3^{rd}$ order | $4^{th}$ order | Average transm. |
| 600 | 89.14% | 28.41% | 0.29% | — | — | 39.28% |
| 800 | 76.84% | 70.55% | 17.36% | 0.45% | — | 41.30% |
| 1000 | 89.99% | 55.25% | 55.02% | 12.47% | — | 53.18% |
| 1200 | 93.47% | 75.95% | 17.49% | 41.27% | 3.97% | 46.43% |

Each column in the table represents transmission values for excitation with a given input mode to a single arm only. The final column is an average transmission over all the previous columns for guided modes. Note that in a real reservoir, the modal composition at the input will take many different forms, and therefore this average transmission is used as a straightforward way to derive an approximate but relevant single figure-of-merit for the device, without having to deal with fully coherent multimodal simulations of an entire RC network. From the results, it is evident that for wider waveguides and junctions, the losses are substantially smaller than for smaller waveguides and junctions by virtue of the power ending up in higher order guided modes rather than being radiated away. As mentioned earlier, for the waveguide widths considered, the highest transmission is obtained in the 1000 nm-1200 nm range. One can argue that maximum transmission occurs in this region because it constitutes the widths at which power conversion from higher to lower order modes is most efficient for the given taper length t=0.1 μm (t is chosen adhoc here). However, to reach the maximum of transmission for both the waveguide widths w 1 and taper lengths t, the influence of the taper length t on the transmission is to be probed.

TABLE 4

Modal decomposition of Y-junction combiner with 1 μm wide waveguides and 0.1 μm long taper for single excitation from upper arm.

| Input source | Transmission from upper arm to input (combiner) | | | | |
|---|---|---|---|---|---|
| | Fundamental | $1^{st}$ order | $2^{nd}$ order | $3^{rd}$ order | $4^{th}$ order |
| Fundamental | 34.94% | 41.94% | 4.67% | 5.01% | 3.44% |
| $1^{st}$ order | 0.46% | 6.38% | 16.12% | 20.72% | 11.56% |
| $2^{nd}$ order | 5.07% | 1.30% | 26.43% | 17.70% | 4.52% |
| $3^{rd}$ order | 6.61% | 0.05% | 0.39% | 2.90% | 2.51% |

Before optimizing the taper length t, first the output modal power composition of the multimode Y-junction with respect to input excitation of a particular mode was checked. Focus was made on the case of a 1 μm wide Y-junction with a 0.1 μm taper. Table 4 represents the transmission from the upper arm into the input in the combiner configuration, while Table 5 shows the transmission from the input into upper arm in the splitter configuration. First it was observed that indeed several modes participate in the guiding of power through the junction, and that the distribution of power over the different modes was very different for different input configurations. It can also be seen that some modal conversion is taking place from input in higher-order modes to output in lower-order, better guided modes. Second, the results allowed to verify the reciprocity of the device (to within simulation tolerances). For example, the transmission from the fundamental mode to the first-order mode in the combiner configuration in Table 4 is 41.94%, whereas the transmission from the first-order mode to the fundamental mode in the splitter configuration is 41.90% in Table 5.

TABLE 5

Modal decomposition of Y junction splitter with 1 μm wide waveguides and a 0.1 μm long taper

| | Transmission from input to upper arm (splitter) | | | | |
|---|---|---|---|---|---|
| Input source | Fundamental | $1^{st}$ order | $2^{nd}$ order | $3^{rd}$ order | $4^{th}$ order |
| Fundamental | 34.95% | 0.56% | 5.05% | 6.52% | 0.36% |
| $1^{st}$ order | 41.90% | 6.52% | 1.36% | 0.05% | 0.01% |
| $2^{nd}$ order | 4.67% | 16.10% | 26.72% | 0.39% | 0.01% |
| $3^{rd}$ order | 5.06% | 20.77% | 17.88% | 2.94% | 0.48% |

Figure 8:
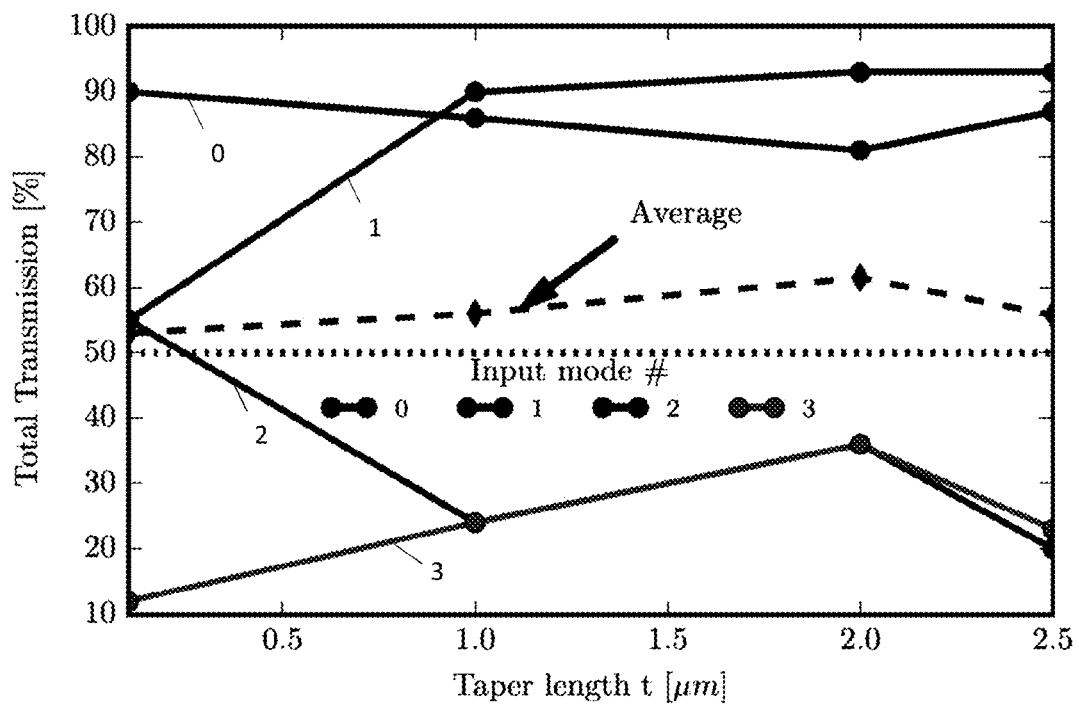
FIG. 8 illustrates the total transmission in the Y-junction combiner for different taper lengths, for an exemplary embodiment of the present invention.

Above, it was demonstrated that by going multi-mode one can gain a small improvement in the transmission of the Y-junction combiner. However, to continue to boost the transmission of the multimode Y-junction, and especially when averaged over many possible input modal excitations, the adiabaticity of the evolution of the input mode set was further tailored by making appropriate changes to the geometry. This was done by altering the taper making up section 2 of the design. The simulations for the choice of the waveguide width were done with a taper length t of 0.1 μm whereby w1=1.0 μm was selected, which was found to be in the region of highest transmission in the first phase of our simulations. The transmission for taper lengths t=0.1 μm, 1 μm, 2 μm and 2.5 μm was tracked. The resulting transmission values for the multimode Y-junction combiner are plotted in FIG. 8 against taper length t for the case of excitation in the upper arm only. Results are shown for input to the upper arm of the junction consisting of the fundamental, 1st, $2^{nd}$ and 3rd order mode. Each solid line corresponds to the denoted input mode and at the output a sum of the transmission across all output modes is plotted as the total transmission. The baseline transmission of 50% for the adiabatic single mode Y-junction is also indicated. The average transmission across all input modes per taper length t is also plotted and is the same figure-of-merit as used in the last column of Table 3. As anticipated, the optimization has resulted in higher transmission values as can be seen by comparing with the results of the t=0.1 μm case (which was used in a previous section to determine the best waveguide width for the multimode Y-junction) to the longer taper lengths.

There are two conflicting trends at work which result in an optimum average transmission occurring at taper lengths around 2.0 μm. On one hand, increasing the taper length increases the adiabaticity which decreases the scattering losses for the guided supermodes and increases the radiation loss of the unguided supermodes. (Note that also for this multimode junction, in the limit of a perfectly adiabatic taper 50% average transmission is expected: 100% transmission for modes 0 and 1, and 0% transmission for modes 2 and 3, which will couple to unguided supermodes). On the other hand, having a certain degree of non-adiabaticity is beneficial to convert some of the higher-order modes into better guided lower-order modes, as shown earlier.

This is the mechanism that allows to get above a 50% average transmission. When looking at the transmission of e.g. modes 2 and 3 as a function of taper length, there is no clear trend, indicating a complicated modal mixing and conversion taking place.

Although further optimization of the design still can be performed, simulation results already show an average transmission of 61% for the combiner, which is much better than the standard 50% average loss in single-mode junctions. As this is the design that will be used in the present example in the reservoir, further simulations were carried out to check its performance when operated in the splitter configuration and obtain 42% average transmission per output arm. While the loss in the splitter is higher than the 50% of the fully adiabatic single mode case, the improvement in the transmission of the combiner yielded net gains in the power efficiency of the reservoir.

Figure 9:
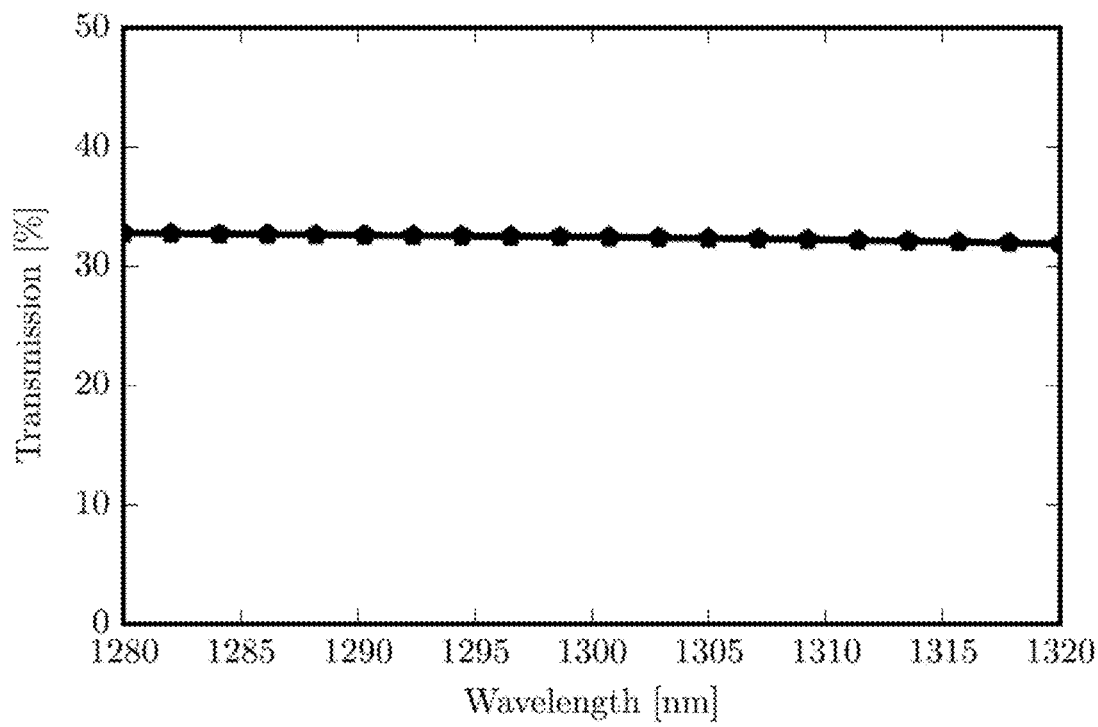
FIG. 9 illustrates the influence of wavelength on the transmission of a multimode Y-junction for an exemplary embodiment of the present invention.

The impact that the wavelength of operation could have on the performance of a passive reservoir system that uses this multimode Y-junction design was also evaluated. FIG. 9 tracks the transmission to the fundamental mode of the output Y-junction combiner from input excitation with the fundamental mode for various wavelengths, in a 40 nm bandwidth around the target wavelength of 1300 nm. Results are given here for the Y-junction of width w1 set to 1 μm and taper length t set to 2 μm. It can be seen that the curve is essentially flat and one can therefore conclude that variations in the wavelength will not impact the performance of the reservoir. Similarly flat curves were obtained for other input-output mode pairs.

The numerical simulations were focused on a model of a 16-node passive integrated photonics reservoir with the nodes arranged in a swirl topology (see FIG. 5). This architecture adheres to the planarity constraints of the CMOS Silicon Photonics platform while simultaneously allowing for sufficient mixing of the input signals. As mentioned, in the design of the multimode Y-junction in the current example, as a figure-of-merit the average transmission across all considered excitations with different modes was used. Therefore, the simulations were setup in a way that matches with this scenario. Specifically, at all points where a combiner is needed we use 61% transmission, and similarly for all splitting locations splitters with 42% efficiency were used. Additionally, as average powers across all modes are taken, the reservoir simulations will not be coherent but will rather calculate the time evolution of the intensity of the input signals. The reservoir was tasked to solve the 3 bit header recognition task. The specific details of the task encoding have been discussed in Vandoorne et al. *IEEE transactions on neural networks* 22 (2011) 1469-1481.

The error rates of the reservoir on the 3-bit header recognition task for multiple data rates for single-mode and multi-mode reservoirs were evaluated and compared. The input data stream is an NRZ OOK modulated signal with an oversampling factor of 24 and the maximum considered data rate is 32 Gbps.

A total input power of 100 mW was used and for each data rate errors were obtained for 10 different random initialisations of the input bit stream and input weights.

Figure 10:
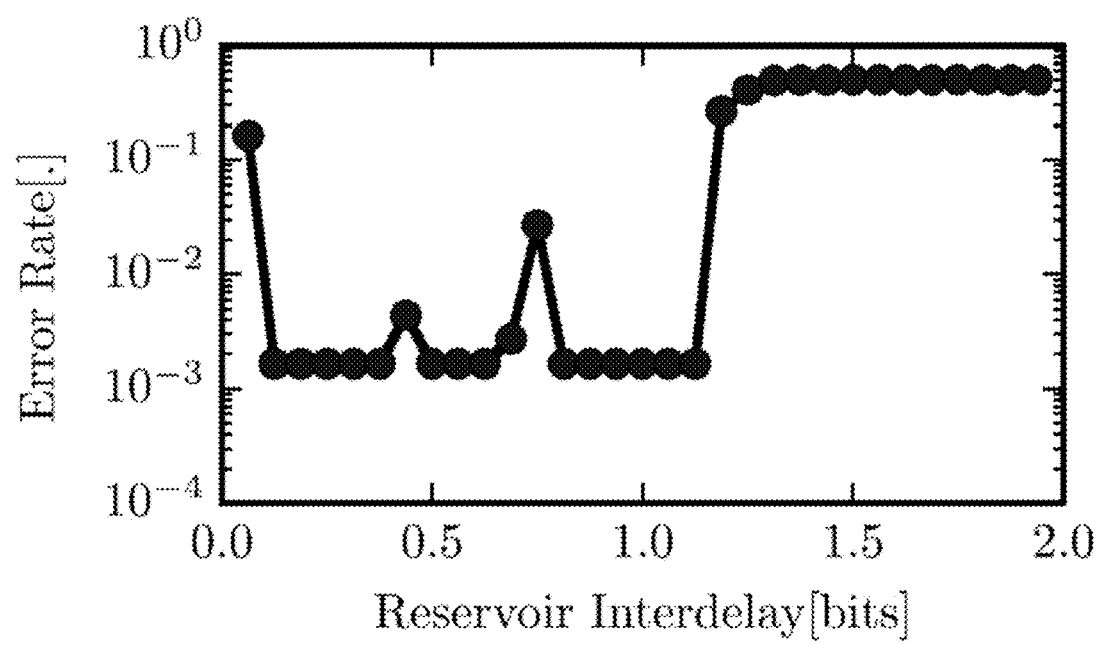
FIG. 10 and FIG. 11 illustrate the error rate versus interdelay for a single mode reservoir respectively multimode reservoir, illustrating features of an exemplary embodiment of the present invention.
Figure 11:
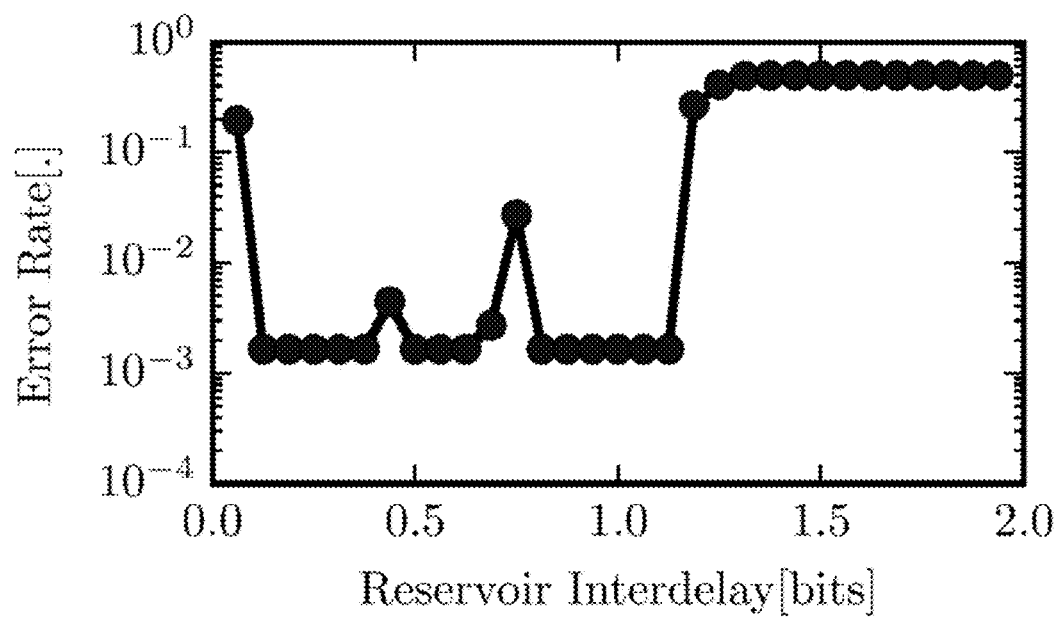

FIGS. 10 and 11 show the results from the error rate vs reservoir inter-delay (a normalization of the data rate to the interconnection delay between 2 adjacent nodes) experiments for the single-mode (FIG. 10) and the multimode reservoir (FIG. 11) cases respectively, for the case of input to node 0. For the most part there is no significant difference in performance when going from single to multi-mode reservoirs, which means there is no performance hit associated to moving to multimodal Y-junctions. In both cases there are regions of performance below the Soft Decision-Forward Error Correction (SD-FEC) limit (corresponding to a BER of $2\times10^{-2}$) which means error-free performance can be reached by applying FEC codes. To see the real benefit of this work, however, energy efficiency is to be studied.

Figure 12:
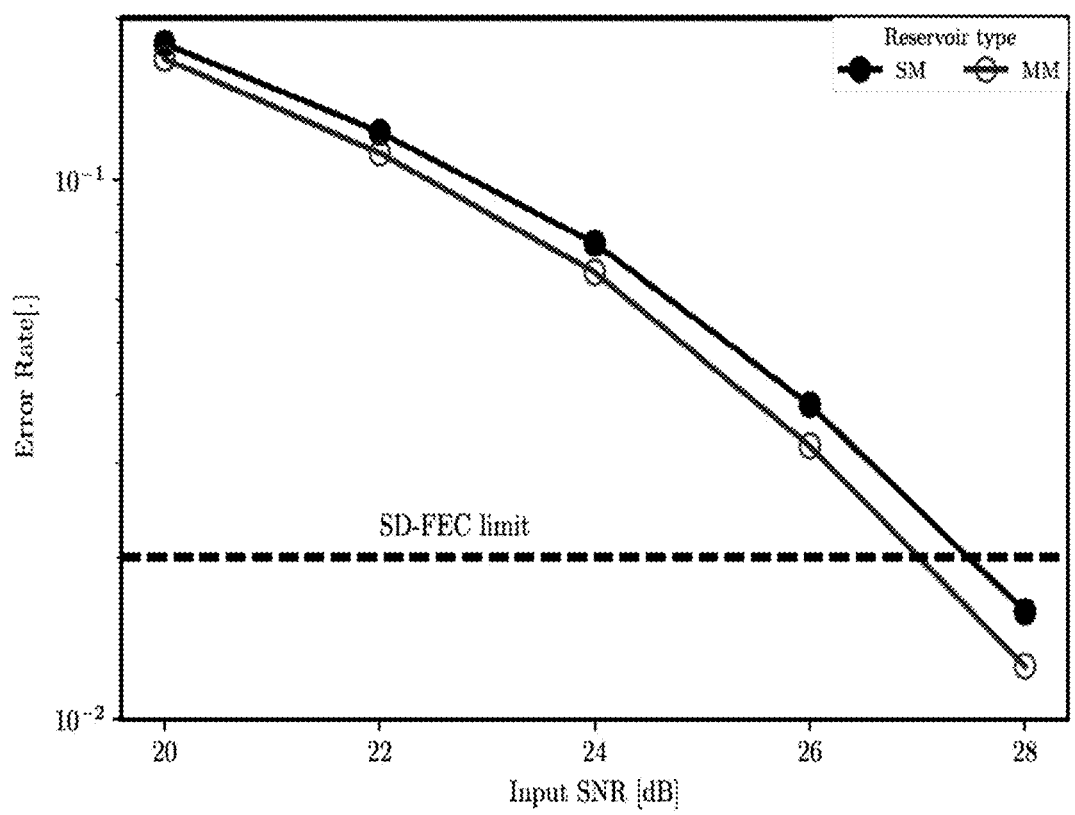
FIG. 12 illustrates the error rate for a single mode reservoir respectively multimode reservoir for different values of the input SNR, illustrating features of an exemplary embodiment of the present invention.

It is shown that energy efficiency benefits can be achieved by replacing a single-mode reservoir with a multi-mode version. First, the error rate for the 16node single-mode and 16 node multi-mode reservoirs on the 3-bit header recognition task is tracked against the input signal to noise ratio as plotted in FIG. 12. It is observed that errors for the multimode reservoir are always lower than those of the single-mode case. The trend also tends to show higher divergence for higher signal to noise ratios. While at the level of the soft decision forward error correction SD-FEC limit (corresponding to an error rate of $2\times10^{-2}$) the difference seems small, it should be noted that this diverging trend will persist when characterized for even lower BERs.

Figure 13:
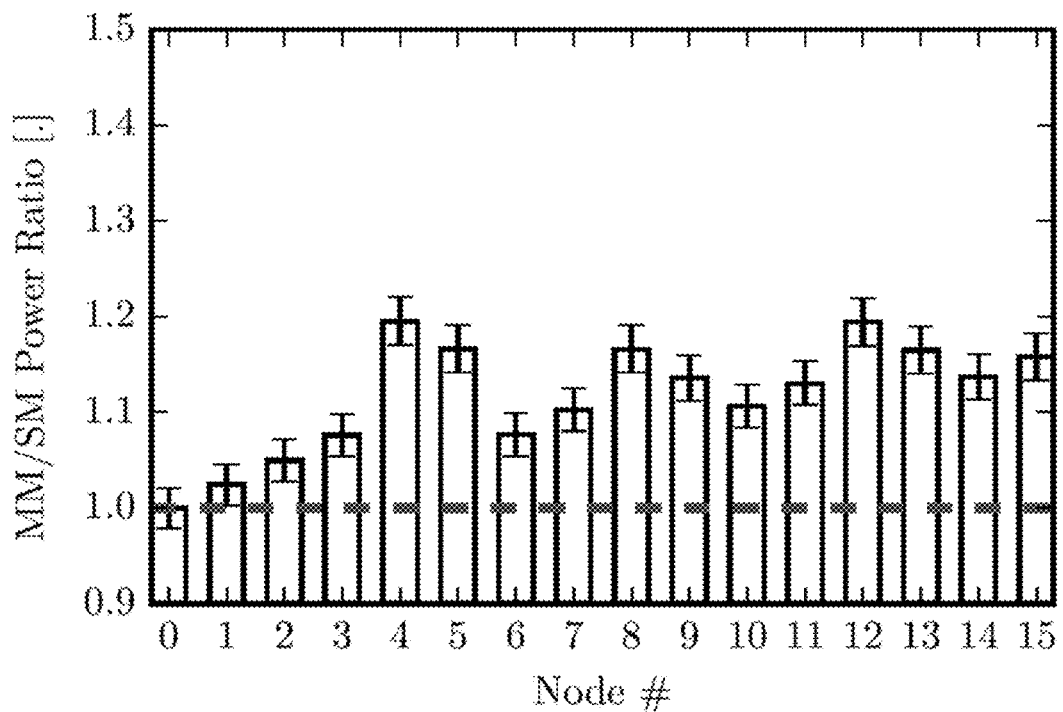
FIG. 13 and FIG. 14 show a comparison of a 16-node respectively 36-node single-mode and multimode reservoir average power per node for input to node 0, illustrating features of an exemplary embodiment of the present invention.

Next, the overall loss of a single-mode reservoir with that of a multimode reservoir is compared. FIG. 13 indicates the per-node power ratios for the 16-node passive reservoir for the multi-mode versus single-mode case for the case of input to node 0. This power ratio is obtained by dividing the average power of the states at each node in the multimode reservoir by the power of the same node in the single-mode reservoir and is shown for the 3-bit header recognition as considered for the performance evaluation. Because node 0 is used as the input in both cases, its power did not change and consequently its power ratio is equal to one. All other nodes have a power ratio above the horizontal red line that indicates where the ratio is equal to one. This means that more power is measured at all those nodes in the multimode reservoir. It is observed that one can get up to 20% more power in nodes such as 4, 8 and 12 (they also happen to be the furthest from the input node in terms of optical path length).

Figure 14:
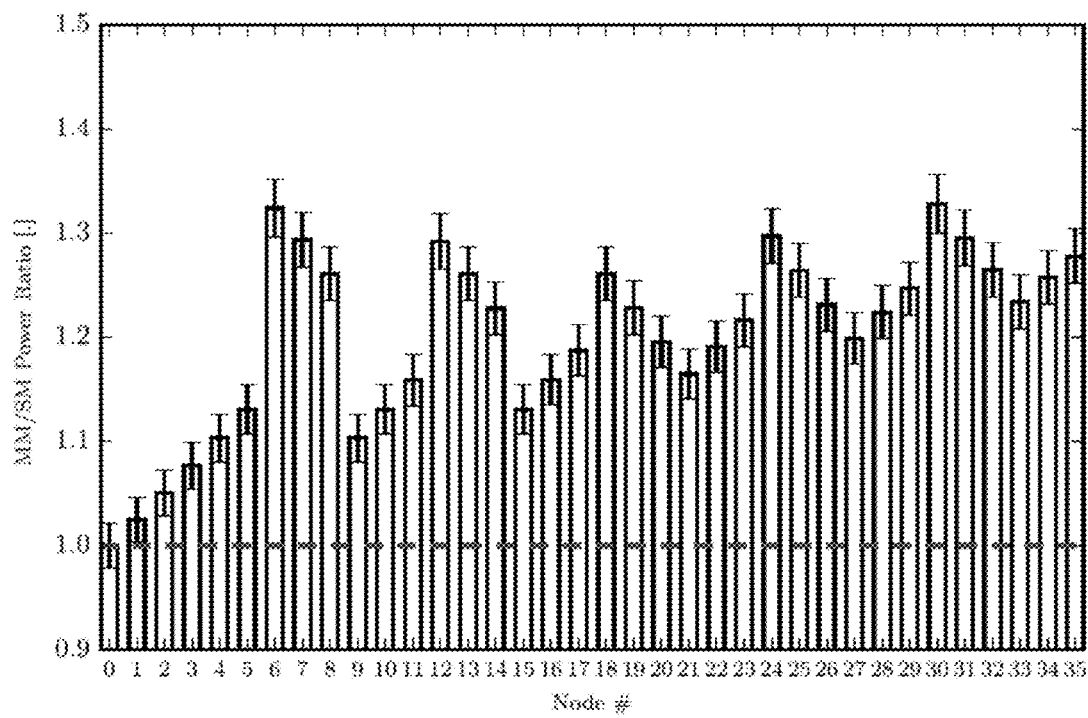

One more experiment was carried out to further investigate how the improvement in the component energy efficiency affects the power distribution in the reservoir as we move to larger reservoirs. The 3-bit header recognition task was re-simulated but this time with a 6×6 (36 node) swirl reservoir. As shown in FIG. 14 comparing the reservoir average power per node for input node 0, one now have nodes that have now more than 30% improvement in their power level (see e.g. nodes 6, 12, . . . ). One can expect for the gains to increase even further as one moves to larger networks. The additional power boost obtained for multi-mode reservoirs could be the difference between being below or above the noise floor and therefore could have significant impact on the performance and scalability of a real-world photonic reservoir computing setup.

The above numerical simulations have shown that one can improve the overall energy efficiency of silicon photonics integrated circuit reservoirs by replacing the typical single-mode components and waveguides with multimode versions. These FDTD electromagnetic simulations show that one can design a low-loss multimode Y-junction with widths ranging from 500 nm onwards but with a preference for 1000 nm to keep the circuit size down while maintaining the advantageous aspects of mode evolution at such a junction.

It was shown that the best designs in the present example can be implemented with taper lengths around 2.0 μm at an optimum level of adiabaticity. The best design in the present example yields a combiner with an average transmission of 61% as opposed to the 50% in the best case single-mode junction combiner. The same device operating as a splitter gives 42% transmission, less than the 50% of the single-mode case, however when the device is used in a reservoir, the improvements in the combiner transmission make up for this reduction in the splitter performance. Further parameter optimization could be used to get even better improvements on the loss. The above example also shows that constructing a reservoir based on the average transmission characteristics for the Y-junction combiner/splitter design of the exemplary embodiment yields the same task performance but gains in energy efficiency, when computing with intensities of the input signal. For single-node input to the reservoir, energy at some nodes could be enhanced up to as much as 30% in the case of a 36 node reservoir. This highlights how the small improvements in a single component design yield benefits that scale with the size of the reservoir. Such an improvement paves the way for building reservoirs with a larger number of nodes than is currently possible and that can therefore solve more complex tasks.

For the sake of completeness, the following details are given regarding the methods used for evaluating. For calculating the eigenmodes of the waveguides, Lumerical© Mode Solutions, a commercial mode solver package, was used. The Film Mode Matching Method-based solver in Fimmwave© was used to double-check the results. For the Lumerical© varFDTD method selected for the propagation simulations and optimization of the parameters of the Y-junctions, an auto non-uniform meshing strategy was chosen at level 5 accuracy and a conformal variant 1 mesh refinement was applied. The center wavelength was set to 1300 nm and a silicon-oxide cladding of refractive index 1.4469 surrounding the 220 nm high silicon waveguide structure with material parameters according to Palik's model in the Lumerical material database was used. The geometries of the structures were designed with Luceda Ipkiss© Photonic Design Environment, exported into the GDSII format and then imported into Lumerical©. The varFDTD method was selected as it enables fast simulations (2D FDTD simulation speeds) with accuracy approaching that of 3D-FDTD simulations for devices with omni-directional in-plane propagation such as the MMI.

Custom time-domain circuit simulation scripts were used based on the Caphe software and scikit-learn library for the machine learning. Unless stated otherwise, a 4×4 (16 node) reservoir architecture was used to generate the states. This number of nodes was chosen as it is a design that is both cost-effective to produce with multi-project wafer runs, but also has a good performance on a number of tasks. In all cases, the length of the interconnections between the reservoir translates to a propagation time of 62.5 ps, matching the current generation of experimentally available chips.

Once the states were obtained and transformed with an appropriate photodetector model taking into account various noise contributions and bandwidth limitations, the readout was trained using the scikit-learn library. For the training, 10,000 randomly chosen bits were fed into the reservoir and the resulting states were used for training with 5-fold cross-validation to optimize the model hyperparameters and yet another 10,000 for testing.

A regularized ridge regression algorithm was used to train the linear readout. Testing is done on the best case resulting from the cross-validation. All reported error rates are related to the test data. With 10,000 bits for testing, error rates are reported at a confidence level of about 90%.

The invention claimed is:

1. A passive photonics reservoir computing system, the system comprising an optical multimode waveguide based structure comprising a plurality of discrete nodes and a plurality of passive multimode waveguide interconnections between the nodes for propagating at least one photonic signal between the nodes, in which each discrete node is adapted for passively relaying the at least one photonic signal over the passive multimode waveguide interconnections connected thereto;

wherein the optical multimode waveguide based structure comprises at least one multimode junction configured for connecting at least three multimode waveguide interconnections using a taper section wherein the taper section is not perfectly adiabatic;

wherein said multimode junctions are multimode Y-junctions for connecting three multimode waveguides interconnections.

2. The passive photonics reservoir computing system according to claim 1, wherein the optical multimode waveguide based structure comprises a plurality of said multimode junctions located at the plurality of discrete nodes, thereby allowing the nodes to repeatedly split and/or combine the at least one photonic signal in the passive photonics reservoir computing system.

3. The passive photonics reservoir computing system according to claim 1, wherein the waveguides have a width of at least 500 nm.

4. The passive photonics reservoir computing system according to claim 1, wherein a taper length is between 2 µm and 2.5 µm.

5. The passive photonics reservoir computing system according to claim 1, wherein the optical waveguide based structure is configured for performing weighting of resulting radiation signals in an optical domain and wherein the system is configured for combining the weighted signals using the multimode Y-junctions configured for connecting three waveguides interconnections using the taper section wherein the taper section is not perfectly adiabatic.

6. The passive photonics reservoir computing system according to claim 5, wherein the system comprises weighting elements for weighting the resulting radiation signals.

7. The passive photonics reservoir computing system according to claim 5, wherein the weighted signals are combined in a larger-area photodiode configured for performing a non-linear operation on the weighted resulting radiation signals.

8. The passive photonics reservoir computing system according to claim 5, the system comprising reverse biased pn junctions for weighting the resulting radiation signals.

9. The passive photonics reservoir computing system according to claim 8, wherein performing a non-linear operation comprises taking a power of the weighted resulting radiation signals prior to summing the weighted resulting radiation signals.

10. The passive photonics reservoir computing system according to claim 8, wherein the system comprises a training module for determining a power of different channels in the system and a phase difference between different channels in the system.

11. The passive photonics reservoir computing system according to claim 10, wherein the training module is configured for obtaining training data whereby weighting coefficients are selected by subsequently selecting one of the weighting coefficients equal to 1 (a.u.), while setting all other weighting coefficients to 0, and by selecting two of the weighting coefficients non-zero, while setting all other weighting coefficients to 0.

12. The passive photonics reservoir computing system according to claim 1, wherein the system comprises a passive silicon photonics reservoir.

* * * * *